UNITED STATES PATENT OFFICE.

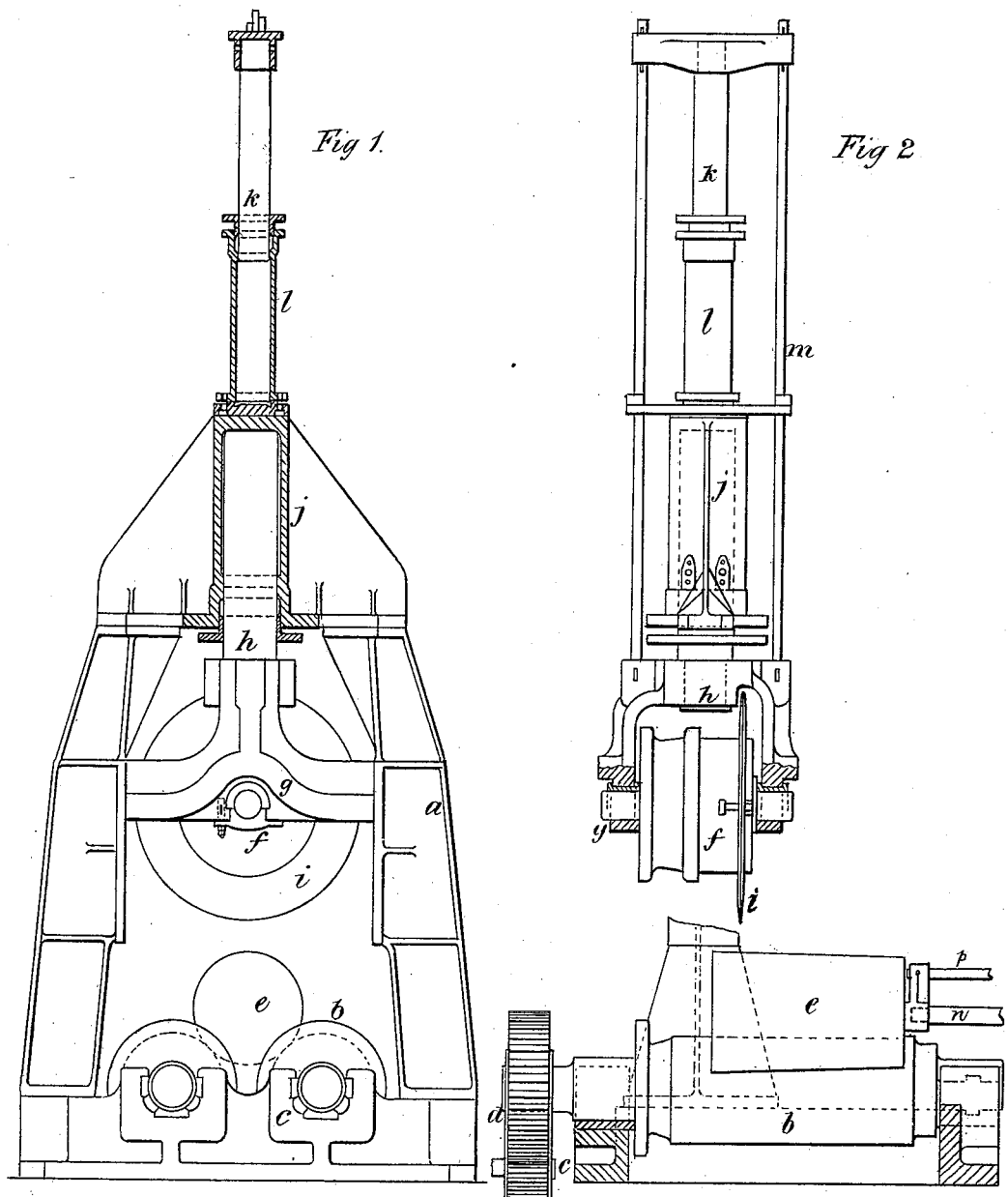

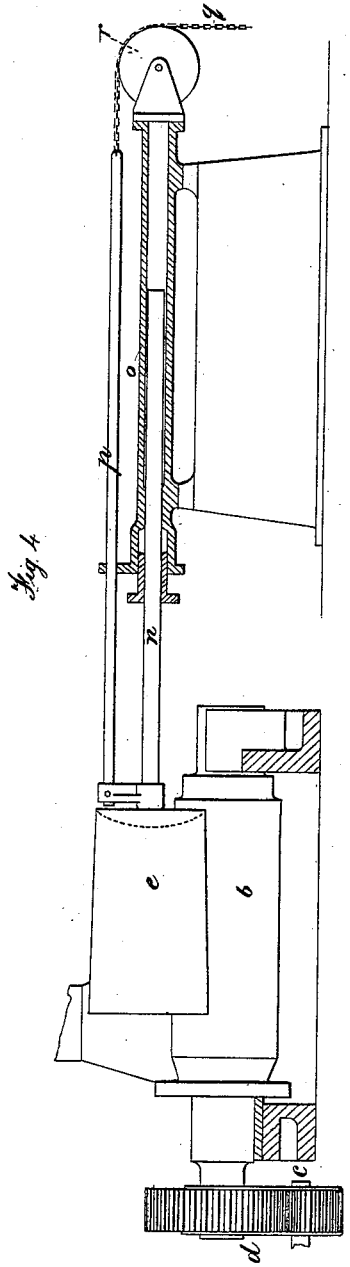

JOHN WILLIAM WAILES, OF BESCOTT, COUNTY OF STAFFORD, ENGLAND.

MACHINE FOR CUTTING AND SHAPING HEATED METAL.

SPECIFICATION forming part of Letters Patent No. 435,955, dated September 9, 1890.

Application filed February 28, 1890. Serial No. 342,085. (No model.) Patented in England February 4, 1888, No. 1,668.

*To all whom it may concern:*

Be it known that I, JOHN WILLIAM WAILES, of Bescott, in the county of Stafford, England, have invented a new and useful Improvement in Apparatus for Cutting and Shaping Heated Metal, (for which I have obtained Letters Patent of Great Britain, No. 1,668, dated February 4, 1888, and nowhere else;) and I do hereby declare the following to be a full, clear, and exact description thereof.

The object of the invention is to provide simple and efficient apparatus for cutting off or partly cutting off and for shaping rings or disks of metal from hollow or solid heated metal ingots or masses of metal, particularly iron and steel, when such metal is circular or nearly circular in cross-section.

Figure 1 is an end view, and Fig. 2 is a side elevation, in both views parts being in section, of my improved apparatus. Fig. 3 is a longitudinal section of the part of the apparatus used for giving longitudinal motion to the ingot or mass of metal. Fig. 4 is a vertical central section of the lower part of the machine.

$a$ is the bed-plate and frame.

$b$ are rollers carried in bearings $c$ on the bed-plate $a$ and serving to carry and rotate the heated ingot or mass of metal to be cut and shaped.

$d$ is a toothed gear for giving rotary motion to the rollers $b$.

Resting on the rollers $b$ is the heated ingot or mass of metal $e$ to be cut and shaped.

$f$ is a roller, free to rotate in bearings $g$, carried by the hydraulic ram $h$.

$i$ is a cutting-disk secured to the roller $f$.

Secured to the frame $a$ is a hydraulic cylinder $j$, within which the ram $h$ works.

$k$ is a hydraulic ram fitting in a cylinder $l$, superposed on the cylinder $j$.

$m$ are a cross-head and tie-rods coupling the ram $k$ to the bearings $g$ of the ram $h$.

Valves and gear of any usual or suitable description are used for controlling the flow of water to and from the cylinders $j$ and $l$.

$n$ is a feed-ram for pushing the heated ingot or mass of metal along the rollers $b$. The said ram works within a cylinder $o$, which is secured in any convenient position back of the rollers $b$ with its end directed toward the position of the metal thereon, (see Fig. 4,) so as to allow the ram $n$ to push forward the said heated ingot or mass of metal.

$p$ is a rod secured to the ram $n$ and attached to a chain $q$, which passes over a pulley $r$, and is secured to a weight for pulling back the ram into the cylinder after it has completed its stroke.

In Figs. 3 and 4 I show the pushing-cylinder in longitudinal section. In Figs. 2 and 4 the end of the pushing-ram is shown bearing against the metal piece $e$ in the act of pushing it along the rollers $b$.

A cock or valve, of any usual or suitable construction, is used for admitting water into the cylinder $o$ and allowing it to flow therefrom.

It is found advantageous to cast or form one end of the heated ingot or mass of metal with a cup-shaped recess, as shown by dotted lines in Fig. 4, so that there may be enough metal to stand firm on the rollers when the last disk is being cut off.

When the apparatus is in use, a heated ingot or mass of metal $e$ is placed on the rollers $b$ and pushed into the required position by projecting the ram $n$ from the cylinder $o$, the rolls cause the heated metal to rotate, and the ram $h$ is made to descend by admitting water above it and press the disk $i$ against the said metal. The disk $i$ rotates with the heated ingot or mass of metal and cuts off the portion required. At the same time the rollers $b$ and $f$ act on the metal so as to partly shape it, say into the form required for making a tire. Water is then admitted to the cylinder $l$ beneath the ram $k$, and is allowed to run off from the cylinder $j$, so that the ram $h$, and with it the roller $f$ and disk $i$, is raised. The ram $n$ is then caused to push the heated metal the required distance along the rolls $b$, and the operation is repeated until the ingot or heated metal is cut into disks.

Instead of using a feed-ram, the heated ingots may be pushed along the rollers by hand or other suitable mechanism.

I claim—

1. The combination of driven supporting-rollers, a cutting-disk rotatory in bearings $g$, and a ram by which the bearings are carried, said ram being adapted to force the disk against metal on the rollers, substantially as and for the purposes described.

2. In apparatus for cutting and shaping metal, the combination of a rotatory shaping-roller $f$, a cutting-disk secured thereto, a rotary support for the metal, and means, substantially as described, for forcing the shaping-roller and cutting-disk against the metal, whereby the latter is shaped and cut, substantially as and for the purposes described.

3. In apparatus for cutting heated metal, the combination of driven supporting-rollers $b$, a cutting-disk rotatory in bearings, a ram which forces the cutting-disk against the metal on the rollers, and a lifting-ram $k$, substantially as and for the purposes described.

4. In apparatus for cutting heated metal, the combination of driven supporting-rollers $b$, a cutting-disk rotatory in bearings, a ram which forces the cutting-disk against the metal on the rollers, and a feeding-ram $n$, which operates to feed the metal on the rollers, substantially as and for the purposes described.

JOHN WILLIAM WAILES.

Witnesses:
   JOHN A. DARBY,
   T. MEADOWCROFT.